July 19, 1927.  F. BUDDENDORF  1,636,587
ELECTRIC CORD REEL
Filed July 10, 1925   2 Sheets-Sheet 2
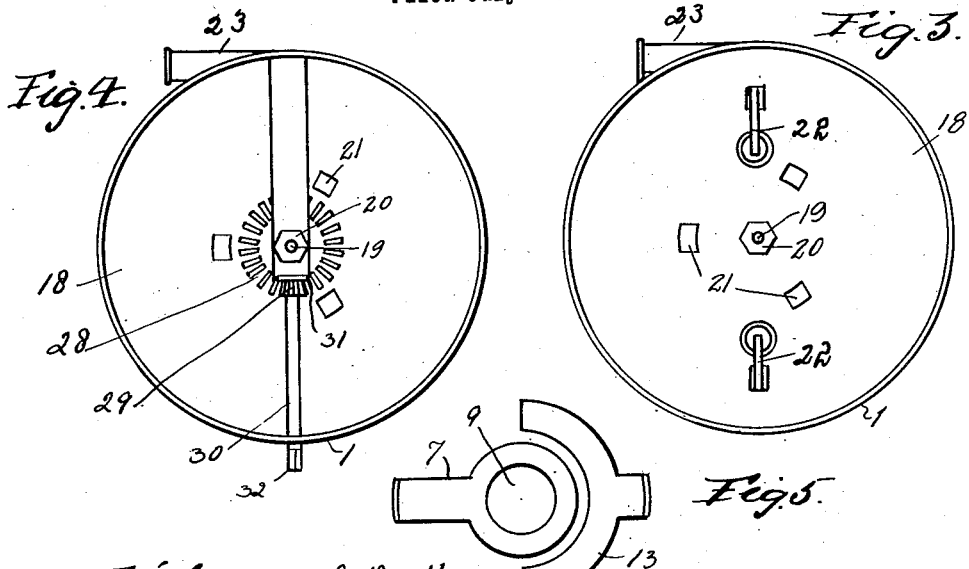
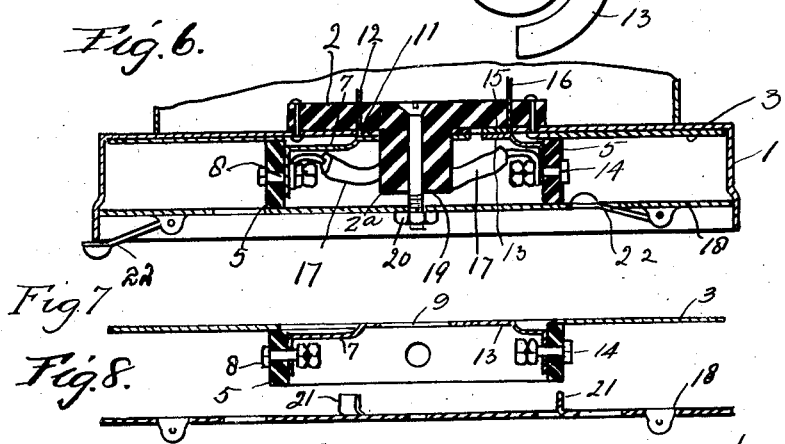
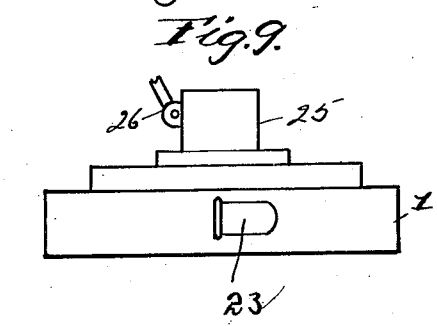
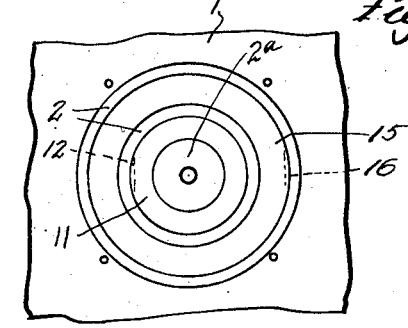
Inventor
Frederick Buddendorf
By W. W. Williamson Patented July 19, 1927.

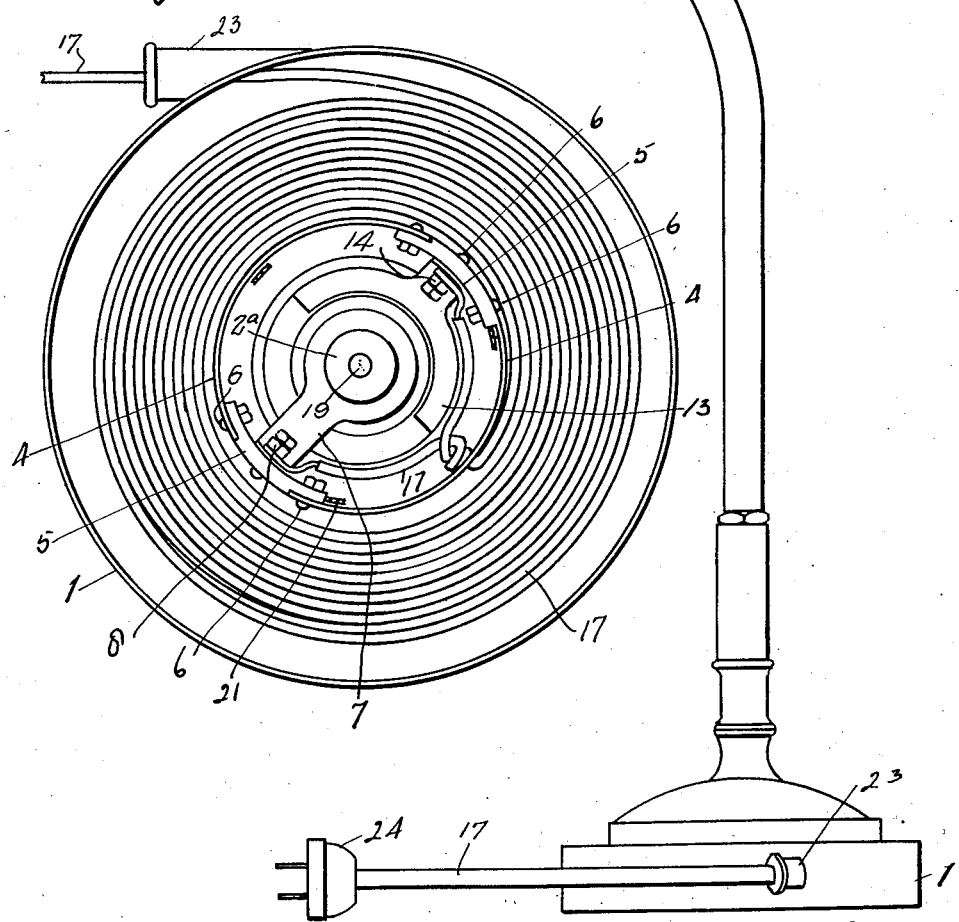

1,636,587

UNITED STATES PATENT OFFICE.

FREDERICK BUDDENDORF, OF PHILADELPHIA, PENNSYLVANIA.

ELECTRIC-CORD REEL.

Application filed July 10, 1925. Serial No. 42,692.

My invention relates to new and useful improvements in an electric cord reel, and has for its object to so construct a hand operated reel of this description which will retain, deliver and return at will of user, a parallel electric cord as used in connection with any device or appliance requiring various lengths of such cord.

A further object of the invention is to provide means for holding and supplying said cord in any desired position limited only by the size and capacity of the reel, a neat and compact manner of holding said cord with a minimum of wear and tear and utilizing the shortest possible length of loose cord when in use the device being so constructed as to permit an easy manner of attaching the cord to the reel within the base of such appliances as lamps, candlesticks and so forth and with a view to simplifying the wiring of such appliances and the renewal of the cord on the reel.

With these ends in view, this invention consists in the details of construction and combination of elements hereinafter set forth and then specifically designated by the claims.

In order that those skilled in the art to which this invention apertains, may understand how to make and use the same, I will describe its construction in detail, referring by numerals to the accompanying drawings forming a part of this application, in which:—

Fig. 1, is an elevation of an electric lamp having my improvement embodied in the base thereof.

Fig. 2, is an enlarged bottom plan view of the base of the lamp the enclosing plate being removed.

Fig. 3, is a view similar to Fig. 2 on a smaller scale, the enclosing plate being in position.

Fig. 4, is a bottom plan view of a slightly modified form of my invention.

Fig. 5 is a detailed plan view of the revolving contact strips.

Fig. 6 is an enlarged central section of the base.

Fig. 7, is a detail section of the reel adapted to fit within the base shown in Fig. 6.

Fig. 8, is an enlarged detail section of the enclosing plate.

Fig. 9, is a side elevation of a reel element having a lamp socket mounted thereon.

Fig. 10, is a detail bottom plan of the stationary contact rings.

In carrying out the invention as here embodied, 1 represents a metal casing or base upon which is secured the insulating block 2 having a hub $2^a$ which projects into the base, with a reel 3 fitted within said base and adapted to revolve concentrically around said hub. 4 represents two semi-circular flanges which are secured to or formed with the reel and to the ends of these flanges are secured the insulating sections 5 by means of the bolts 6.

7 represents one of the contact strips secured to one of the insulating sections 5 by the connector bolt 8 and this strip has an opening 9 in the center thereof adapted to fit over the hub and bear against the contact ring 11 which latter is provided with a terminal 12 which projects through the insulating block 2 for the purpose hereinafter set forth.

13 represents the second contact strip and this strip is secured to the opposite insulating section 5 by means of the connector bolt 14, this last named strip terminating in a semi-circle which partly surrounds the contact strip 7, the strip 13 bearing against the contact ring 15 the latter having the terminal 16 projecting through the insulating block 2.

To the connector bolts 8 and 14 are attached the ends of the parallel wire cord 17 so that the passage of the current through the terminals 12 and 16 will be uninterrupted while the reel is revolving or while said reel is held in any position.

The cord 17 is so positioned that when the reel is revolved it will be wound upon the latter or unwound therefrom being held against displacement by the disc 3 and the enclosing plate 18 which latter is pivoted upon the stud 19 secured within the insulating block 2, a nut 20 serving to hold the enclosing plate in place.

The enclosing plate 18 is provided with the inturned lugs 21 shown in Figs. 2 and 8, these lugs lying in the path of the edges of the insulating sections 5 serve to transmit the rotations of the enclosing plate to the reel for winding and unwinding the cord. A handle 22 is carried by the enclosing plate 18 for convenience in revolving the same and this handle is preferably pivoted to said plate so that when in use it may be turned upward out of operative position.

An outlet 23 is preferably carried upon the side of the base and through this outlet passes the cord 17 having a connector 24 secured to its outer end in order that it may be attached to the usual socket for conveying current to the device.

When the device herein described is utilized as a lamp base as shown in Fig. 1, the cord may be drawn out to any desired length and the connector attached to the source of current thus supplying current to the lamp without having the surplus cord hanging in loops which often cause accidents and when the lamp is out of use the cord may be entirely wound within the base by the revolving of the enclosure plate 18 thus keeping the cord in good condition and preventing its wear and tear which would otherwise take place with a loose cord.

When the device is to be used in connection with various devices other than lamps a socket 25 is mounted upon the base and connected in the usual manner with the terminals 12 and 16 provided with a switch 26 by which the current may be turned on or off at the point of a socket and by this arrangement various cooking appliances such as percolators, toasters or the like, as well as shop appliances such as soldering irons or the like may be attached to the socket with a relatively short cord, the amount of cord necessary to reach the point desired being supplied by unwinding the cord 17 from the reel thus utilizing no more cord than is necessary for the particular purpose which is of great advantage in kitchen and shop practice.

In Fig. 4, I have shown a slight modification in the method of operating the reel which consists in providing teeth 28 upon the enclosing disc 18 and utilizing a pinion 29 to mesh with said teeth, said pinion being carried by the shaft 30 which is journalled in the lug 31 and the rim of the base 1. This shaft may have a knurled knob upon its outer end for revolving the same or it may be squared as indicated at 32 for the application of a key and by revolving this shaft the enclosing plate will be revolved and the parts connected therewith in the same manner as before described.

Of course I do not wish to be limited to the exact details of construction as herein shown as these may be varied within the limits of the appended claims without departing from the spirit of my invention.

Having thus fully described my invention, what I claim as new and useful is:—

1. In an electric cord reel of the character described, a hollow base, an insulating block secured to said base, said block having a hub projecting into the base, a reel mounted within the base upon and adapted to revolve concentric with the hub, two insulating sections carried by the reel, contact strips secured to the insulating sections, contact rings secured upon the insulating block, each of said strips contacting with one of said rings, a parallel wire cord having each of the wires thereof connected with one of the contact strips, said cord being so positioned as to be wound upon or unwound from the reel when the latter is revolved, and means for manually revolving the reel.

2. In a device of the character described, a hollow base, a reel mounted within said base, an insulating block having a hub, upon which the reel is mounted projecting into the said base, an enclosing plate fitted to revolve within the base having means for engaging the reel, means for manually revolving said plate, a parallel wire cord having its ends attached to the reel, said cord being so positioned as to be wound upon or unwound from the reel when the enclosing plate is revolved, and means for conveying current from the cord to an electrically operated device carried by or connected with the base.

3. In a device of the character described, a base, a reel comprising a disc adapted to fit within said base, segmental flanges carried by said disc, insulating sections secured between the ends of said flanges, a contact strip carried by each of the insulating sections, said contact strips being adapted to bear upon contact rings carried by the base, an enclosing plate fitting within the base so as to revolve therein, lugs carried by said plate for projecting into the path of the insulating sections so that the revolving of the enclosing plate will revolve the reel, and means for manually revolving the enclosing plate.

In testimony whereof, I have hereunto affixed my signature.

FREDERICK BUDDENDORF.